(No Model.)

G. DENTGEN.
MACHINE FOR BENDING WIRE SPRINGS.

No. 309,295. Patented Dec. 16, 1884.

WITNESSES:
H. Rassbach
Otto Risch

INVENTOR
Gustav Dentgen
BY Paul Goepel
ATTORNEY.

(No Model.)　　　　　　　　　　　　　　　　　　5 Sheets—Sheet 2.
G. DENTGEN.
MACHINE FOR BENDING WIRE SPRINGS.
No. 309,295.　　　　　　　　　　　　Patented Dec. 16, 1884.

(No Model.) 5 Sheets—Sheet 3.

G. DENTGEN.
MACHINE FOR BENDING WIRE SPRINGS.

No. 309,295. Patented Dec. 16, 1884.

WITNESSES:
H. Rassbach
Otto Risch

INVENTOR
Gustav Dentgen
BY Paul Goepel
ATTORNEY (No Model.) 5 Sheets—Sheet 4.
G. DENTGEN.
MACHINE FOR BENDING WIRE SPRINGS.
No. 309,295. Patented Dec. 16, 1884.
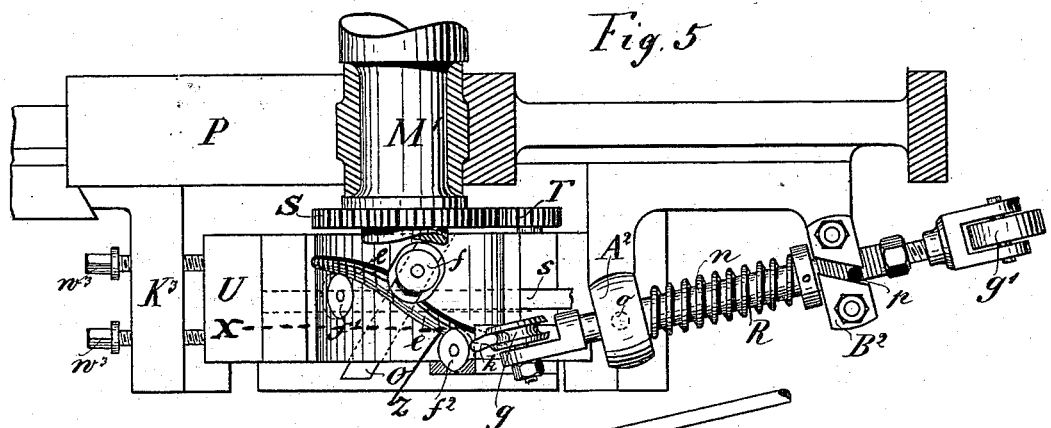

(No Model.) 5 Sheets—Sheet 5.
G. DENTGEN.
MACHINE FOR BENDING WIRE SPRINGS.
No. 309,295. Patented Dec. 16, 1884.
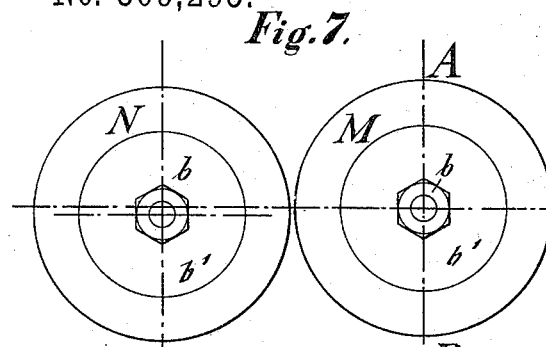
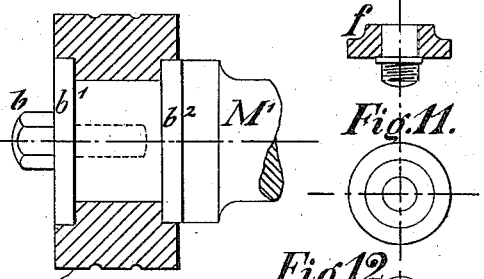
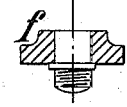
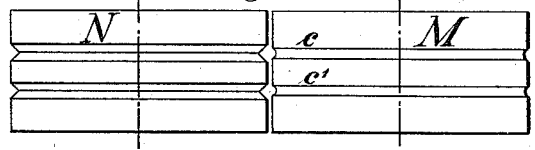
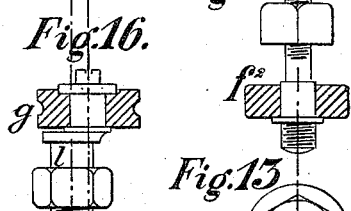
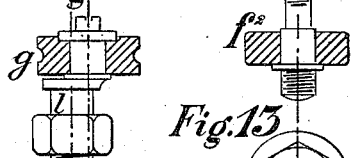
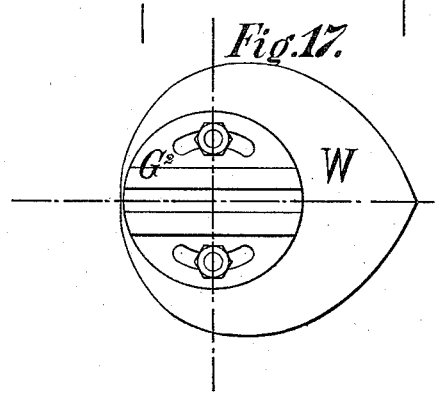
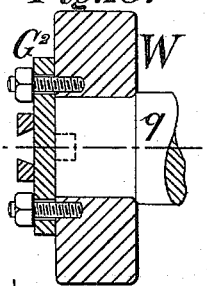
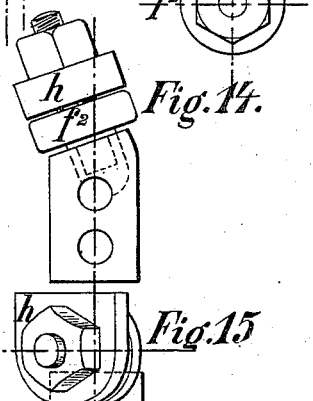
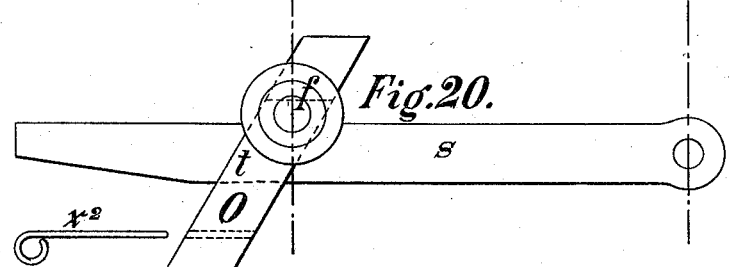
Witnesses.
Jol. N. Rosenbaum
Otto Risch
Inventor.
Gustav Dentgen
by Paul Goepel
Attorney.

UNITED STATES PATENT OFFICE.

GUSTAV DENTGEN, OF DÜREN, PRUSSIA, GERMANY.

MACHINE FOR BENDING WIRE SPRINGS.

SPECIFICATION forming part of Letters Patent No. 309,295, dated December 16, 1884.

Application filed May 10, 1882. (No model.) Patented in Germany March 21, 1880, No. 12,156, and March 6, 1881, No. 15,520; in France April 19, 1880, No. 136,208, and in Belgium April 30, 1880, No. 51,203.

*To all whom it may concern:*

Be it known that I, GUSTAV DENTGEN, of the city of Düren, in the Kingdom of Prussia and Empire of Germany, have invented certain new and useful Improvements in Machines for Bending Double Conical Wire Springs, of which the following is a specification.

This invention has reference to an improved machine for bending double helical wire springs for mattresses, sofas, and other upholstered articles in such a manner that with each complete revolution of the driving-shaft a double helical wire spring of any desired size or pitch is produced, and then cut off by the action of the machine; and the invention consists of a machine for winding double helical wire springs in which the wire is fed to two bending-rolls, having an intermediate guide-piece, of a compound bending mechanism arranged below one of the bending-rolls for giving a spiral bend to the wire, a grooved holding-block, a pusher having a grooved end roller that imparts the double helical shape to the wire, a wire-cutting mechanism whereby each spring after being completed is separated from the next following, and mechanism whereby the different parts are operated from a common driving-shaft, as will appear more fully hereinafter, and finally be pointed out in the claims.

Figure 1:
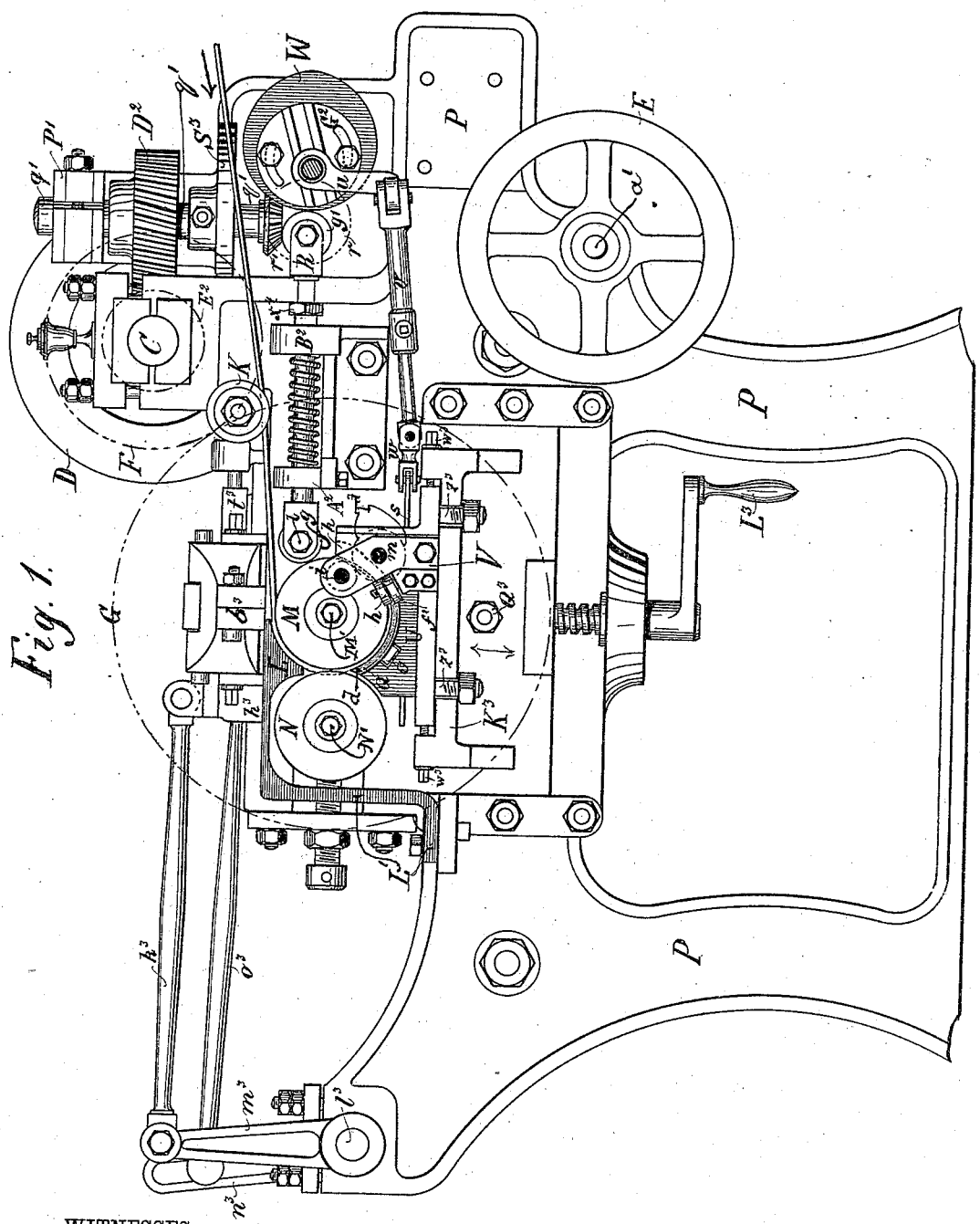
Figure 2:
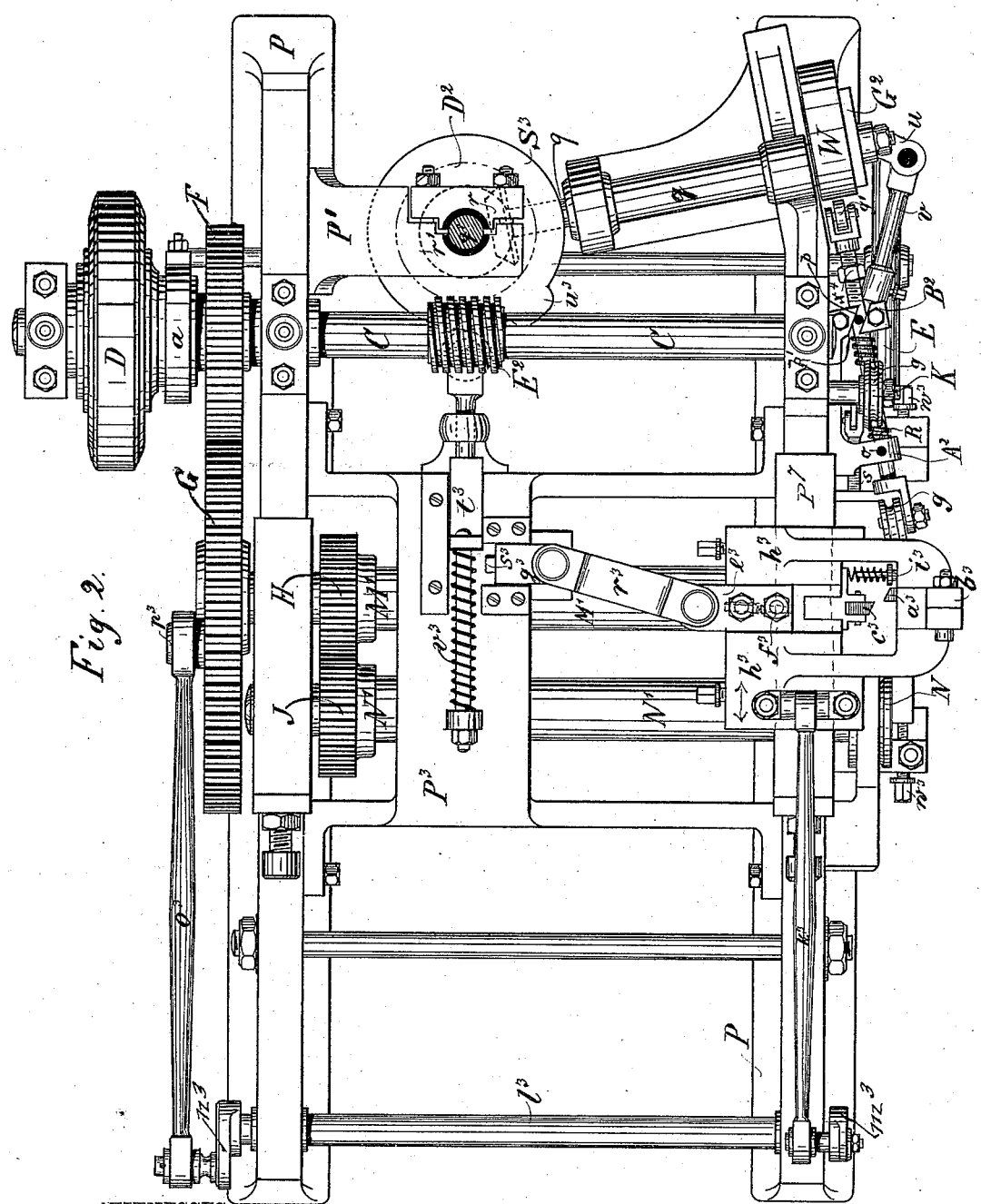
Figure 3:
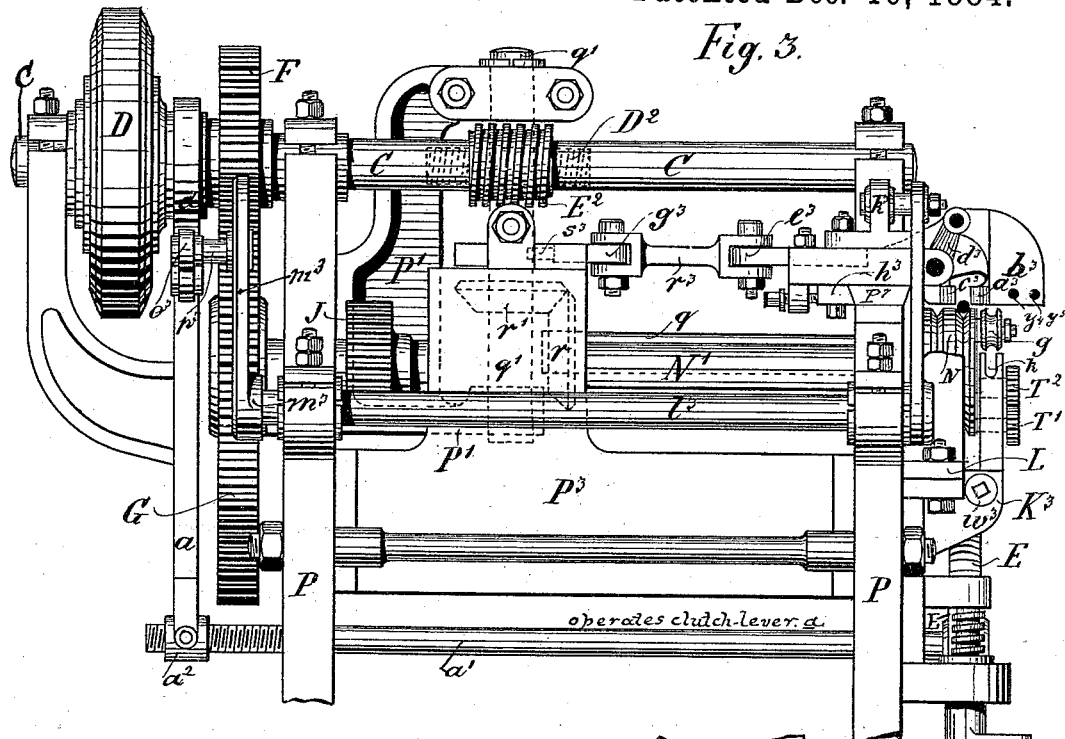
Figure 4:
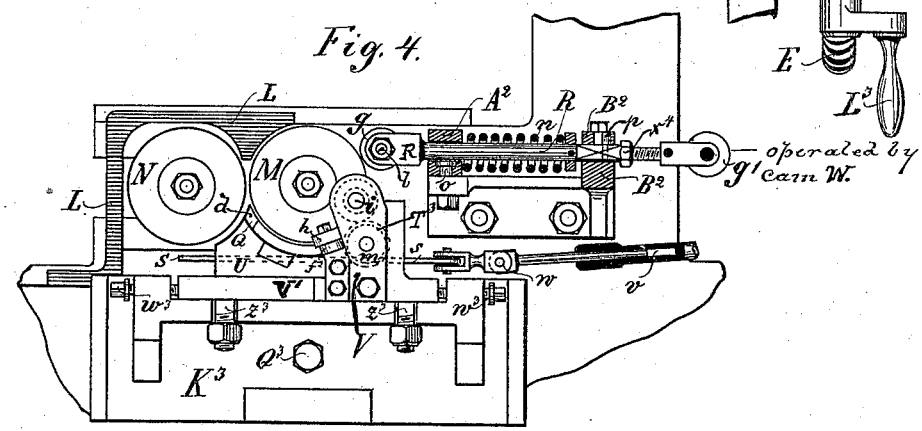
Figure 6:
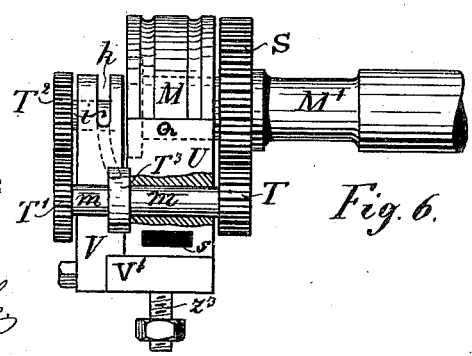

In the accompanying drawings, Figure 1 represents a side elevation of my improved machine for bending double helical wire springs. Fig. 2 is a plan view. Fig. 3 is an end elevation of the same. Figs. 4 and 5 are a side view and a plan view, partly in section, of the bending mechanism, drawn on an enlarged scale. Figs. 5ª and 5ᵇ are respectively a side view and a plan view, both on an enlarged scale, of the bending mechanism, showing the course of the wire through the same. Fig. 6 is a detail side view of the roller and guide-block which take up the wire after the spiral bending has been given and feed it to the roller that imparts the double helical shape. Figs. 7, 8, and 9 are respectively a front view, a top view, and a vertical transverse section, on line A B, Fig. 7, of the bending-rolls that impart the first circular bend to the wire. Figs. 10 and 11 are a detail section and a top view of one of the guide-rollers of the compound mechanism for spirally bending the wire. Figs. 12, 13, 14, and 15 are details of another guide-roller of the spiral bending mechanism. Fig. 16 is a detail vertical central section of the grooved roller of the pusher, whereby the double helical shape is imparted to the wire. Figs. 17 and 18 are a side view and a vertical transverse section of an eccentric cam that imparts motion to the pusher for imparting the double helical shape to the wire spring, and Figs. 19 and 20 are detail side and top views of the movable roller of the spiral-bending mechanism and its actuating parts.

Similar letters of reference indicate corresponding parts.

Referring to the drawings, P represents the main frame of my improved machine for bending mattress-wires. This frame carries in three bearings the main driving-shaft C, which imparts motion to the different operating parts of the machine. The driving-shaft C is provided with a friction-clutch, D, that is operated by a forked lever, *a*, swiveled nut $a^2$, and transverse screw-rod $a'$, having a hand-wheel, E, so that the driving-shaft C may be thrown in and out of gear whenever the machine is to be started or its motion interrupted.

Parallel to the main driving-shaft C are arranged in suitable bearings of the main frame P the shafts M' and N' of the bending-rolls M and N. These bending-rolls M and N receive rotary motion in opposite direction to each other by the transmitting gear-wheels F, G, H, and I, of which the gear F is applied to the driving-shaft C, the gears G and H on the shaft M' of the bending-roll M, and the gear I on the shaft N' of the bending-roll N. The bending-rolls M and N are arranged at the outer ends of the shafts M' and N' at the side opposite to that to which the transmitting-gears are applied. All the working mechanisms of the machine are arranged at the same side as the bending-rolls and in close proximity thereto. The bending-rolls M and N are attached to their shafts by means of a small center screw, *b*, and a disk-shaped plate, *b'*, as shown clearly in Figs. 7 and 9, and are provided with two circumferential grooves equidistant from each other and from the ends, for the purpose of admitting the reversing of the rolls, for using the second groove whenever the first has been worn out by use. The shafts M' and N' are each provided with a shoulder, $b^2$, of the same size as the disk-shaped plate $b$, which shoulder is of the same diameter as the plate $b'$, so as to fit in the recess for the same in either face of the rolls M and N and admit the rigid attachment of each roll to the shaft after reversing. The cross-section of the grooves of the bending-rolls M and N is such that the wire which is fitted to the grooves is taken hold of at three points, as shown in Fig. 8, and in such a manner that the same is conducted, without being pressed or injured by the bending-rolls, through the entire bending mechanism. The wire is conducted in its way to the bending-rolls M and N along a grooved guide-roller, K, and then to a grooved guide-segment, L, that is applied intermediately between the rolls M and N at the end of an angular arm, L', that is screwed to the main frame P, as shown clearly in Fig. 1. The grooved segment L is placed in a closer proximity to the upper part of the bending-roll M, but at a somewhat greater distance from the roll N, as the shaft of the latter is not in the same horizontal plane as the center of the roll M, but slightly below the same, as shown clearly in Fig. 7. The bending-rolls M and N take up the wire and impart to it a circular bending. They conduct it then to a steel throat, $d$, of the compound mechanism designed for the spiral bending of the wire. (Shown in Fig. 5.) This mechanism for imparting a spiral bend or twist to the wire consists, essentially, of a concave plate, Q, having a spiral groove, $e$, said plate being arranged below and concentrically to the bending-roll M. The spiral groove $e$ of the grooved plate Q, in connection with three guide-rollers, $f$ $f'$ $f^2$, impart a greater or smaller degree of spiral pitch to the wire, so that it receives thereby a twist from right to left around its axis, while the bending-rolls M and N simply impart a circular bending action to the wire. The groove $e$ of the plate Q has the special purpose of conducting the wire from the bending-rolls M and N to the rollers $f$ $f'$ $f^2$, as shown in Fig. 5. The plate Q is wider than the roll M, so as to extend forward beyond the same, the dotted line $x\,y$, Fig. 5, indicating the width of the roll M, while the point marked $z$ in the same figure indicates the point where the wire leaves the roll M.

To prevent any back pull upon the wire at that point, and also any flattening or injuring of the same by the sharp edges of the bending-roll M and groove $e$, the roller $f^2$ is provided at this point with a small plate, $h$, (shown in Figs. 4, 14, and 15,) which plate is screwed up against a shoulder of the arbor of the roller $f^2$, (shown in Fig. 14,) so as to be retained in fixed position without interfering with the rotary motion of the roller $f^2$. The plate $h$ overlaps closely the edge of the plate Q, and retains thereby any remaining portion of the wire in the groove $e$ when the same is to be withdrawn from the machine preparatory to passing a new roll of wire through the same. When the wire has passed the spiral groove $e$, and has received the twisting action around its axis, which is imparted thereto by the joint action of the rollers $f$ $f'$ $f^2$, of which the rollers $f'$ and $f^2$ are placed in a fixed position at one side of the groove, while the roller $f$ is arranged at the other side of the groove on a laterally-guided carrier, O, the motion of which is controlled by a slide-piece, $s$, as will appear hereinafter, the wire is conducted from the last roller, $f^2$, of the spiral-bending mechanism to a short shaft, $i$, (shown in Figs. 4 and 6,) which shaft is revolved quicker than the bending-rolls M and N by a gear-wheel transmission, S T T' T$^2$, (shown in Fig. 6,) of which the gear S is keyed to the shaft M', while the gears T T' are applied to an intermediate shaft, $m$, that turns in bearings of a supporting-block, U, of the guide-plate. The gear T' meshes with the gear-wheel T$^2$ on the short shaft $i$ and imparts thus rotary motion to the latter. The shaft $i$ is supported by a block, V, which is screwed fast to the bracket-plate V', to which the bearing-block U is applied, as shown in Figs. 4 and 6. The supporting-block V is provided with a vertically-ascending slot, K, which forms a continuation of the spiral groove $e$ of the plate Q, said slot extending down to the surface of the revolving shaft $i$, as shown in Fig. 6. A small roller, T$^3$, that is keyed fast to the intermediate shaft, $m$, exerts a lifting action on the wire, so as to prevent the friction of the same with the bottom of the groove $e$, for which purpose the roller T$^3$ projects slightly above the bottom of the groove $e$. The wire is conducted along the concave and grooved plate Q to the slot K of the block V, and is drawn forward by the greater speed of the short shaft $i$, being delivered in nearly vertical direction against a grooved roller, $g$, which is applied eccentrically to a short shaft, $l$, at the end of a pusher-rod, R, as shown in Fig. 16. As the short shaft $l$ is screwed fast to the end of the pusher-rod R, it is obvious that thereby the vertical distance of the roller $g$ from the shaft $i$ may be exactly adjusted, while the horizontal distance of the roller $g$ from the shaft $i$ is adjusted by a screw-nut, $x^t$, on the pusher-rod R, as shown clearly in Fig. 4. The pushing-rod R serves, by the gradual forward motion which it imparts to the grooved end roller, $g$, the purpose of imparting to the spirally-bent wire a gradually-increasing degree of curvature as the distance of the different convolutions from their common axis is gradually diminished up to the middle of the wire spring, where the distance is smallest, when, by the gradual withdrawal of the roller $g$, the distance of the convolutions from the axis increases again until the second half of the wire spring is bent. The pusher-rod R is necessary to impart the double helical bending action, as by the binding-rolls M and N the wire receives only a curvature of uniform radius, and by the rollers of the spiral-bending mechanism only a spiral bend or twist around its axis. The pusher R is supported in two bearings, $A^2$ $B^2$, which are both applied to a bracket of the main frame P. The bearing $A^2$, next to the end roller, $g$, is made axially movable on the supporting-bracket, while the second bearing, $B^2$, provided with a square opening and an oblique slot, $p'$, guides the square portion of the pusher-rod R by means of a projecting pin, $p$, so as to impart thereby a lateral motion to the rear part of the pusher simultaneously with the pivotal motion of the same around the front bearing, $A^2$. The rear end of the pusher-rod R is provided with a smooth anti-friction roller, $g'$, which forms contact with an eccentric cam, W, that is wide enough to provide for the lateral motion of the pusher-rod, as shown in Fig. 2. The lateral motion of the rear part of the pusher-rod R is imparted, also, but in a smaller degree and in an opposite direction, to the bending-roller $g$, for the purpose of reducing or enlarging the radius of the double helical spring. As the radius of the different convolutions varies, it is also necessary to vary the pitch of the different convolutions relatively to a horizontal plane, or, in other words, the smaller the radius of the convolutions the greater has to be the degree of pitch or the angle of inclination of the same. This is obtained by the heart-shaped cam W and by a spiral spring, $n$, which is interposed between the front bearing, $A^2$, and a fixed collar on the pusher-rod, (shown in Fig. 4,) and which keeps up the contact of the roller $g$ with the cam W. The cam W (shown in detail in Figs. 17 and 18) is keyed fast to a shaft, $q$, which turns in bearings of the main frame P, and which carries at its inner end a beveled gear-wheel, $r$. (Shown in Figs. 1 and 2.) The beveled wheel $r$ meshes with a second beveled wheel, $r'$, which latter is applied to the lower end of a vertical shaft, $q'$, that turns in bearings of a double bracket, P', of the frame P. The vertical shaft $q'$ receives rotary motion by a worm-gear, $D^2$, which meshes with a worm, $E^2$, on the driving-shaft C.

The motions of the bending mechanisms and of the pusher-rod are so arranged that each full revolution of the driving-shaft C produces a complete double conical wire spring, while the action of each half of the eccentric cam W upon the pusher R forms one-half of the same. The eccentric cam W is also utilized for the purpose of imparting a lateral reciprocating motion to the carrier O of the bending-roller $f$. This is accomplished by arranging upon the face of the cam W a disk, $G^2$, which carries parallel guideways, forming a dovetailed groove. The disk $G^2$ is centrally pivoted, and provided at opposite sides of the guideways with segmental slots, by which the disk $G^2$ is guided along fixed screws, as shown in Figs. 17 and 18, so as to receive a partial rotary motion around its pivot, and impart thereby to the arm $u$, Fig. 1, a certain oscillating motion, which, in connection with the rotation of the cam, imparts a slow reciprocating motion to a slide-piece, $s$, by the intermediate rod, $v$, and the universal joint $w$. The universal joint between the adjustable rod $v$ and the slide-piece $s$ is necessary, as the plane of motion of the slide $s$ is not in the same plane of motion as the oscillating crank-arm $u$. The end of the slide-piece $s$ is made tapering or wedge-shaped, so as to take easier in the guide-groove at the bottom of the carrier O. When the wire is conducted forward between the bending-roll M and the plate Q, it is necessary to prevent it from getting in between the exterior circumference of the roller $f$ and the opposite side wall of the groove $e$, whereby the passage of the wire through the spirally-bending rollers would be hindered. To prevent this it is only necessary to retain the carrier O in its outermost position without the use of the slide $s$, which is accomplished by the simple insertion of a pin, $x^2$, into a corresponding perforation of the carrier O, as shown in Fig. 20. In this position of the carriage O the wire is taken up directly by the ogee circumference of the roller $f$, so that it is carried along by the same and conducted properly along the different bending-rollers.

I have so far described the mechanism that is employed for bending the wire in a continuous manner into a spring of double helical shape at each revolution of the driving-shaft, and I will now proceed to describe the mechanism whereby each spring, as its bending is completed, is cut off from the next following spring. This is obtained by an intermittently-actuated cutting mechanism, which works in such a manner that the wire is not in any way retarded while the machine is in motion.

The cutting mechanism consists of two steel knives, $a^3$ $c^3$, of which the former is secured by small pins $y^4$ and $y^5$ to a fixed jaw, $b^3$, while the latter is applied to an oscillating lever-arm, $d^3$, which is pivoted to the fixed jaw $b^3$ and to the end of a slide, $e^3$, the steel knife $c^3$ being carried against the knife $a^3$ by the slide $e^3$, that can be lengthened or shortened by set-screws $f^3$. The slide $e^3$ is connected by a pivot with a forked link, $r^3$, which is connected with a laterally-guided piece, $q^3$, having a steel nose, $s^3$. The link $r^3$ and guide-piece $q^3$ form a toggle-lever arrangement, which, on being straightened out, actuates the movable cutting-knife and forces it against the fixed knife, so as to cut off the double helical spring at the proper moment.

Both cutting-knives and their actuating mechanism are applied in such a manner to a sliding carriage, $h^3$, (shown in Figs. 2 and 3,) that they move forward with the wire during the cutting motion. The carriage $h^2$ is moved along a dovetailed guide-rail, $P^2$, of the frame P by means of a connecting-rod, $k^3$, as shown in Figs. 1 and 3. The latter is connected to the crank-arm $m^3$ at the opposite end with an adjustable crank-rod, $O^3$, that is applied to an eccentric pivot, $p^3$, of the gear-wheel G. The cutting-knives $a^3$ and $c^3$ are kept apart by a spiral spring, $i^3$, (shown in Fig. 2,) so that they allow the wire to pass while they follow the motion of the same. During this time the guide-piece $q^3$ is moved in its guides, which are applied to a bridge or platform, $P^3$, at the middle part of the main frame P, until a slide-rail, $t^3$, that is arranged at right angles to the guide-piece $q^3$ and is guided in ways of the bridge $P^3$, is thrown into the path of the steel nose $s^3$ of the guide-piece $q^3$, at which moment the guide-rail $e^3$, and with it the lever $d^3$ and the knife $c^3$, is forced by the action of the toggle-levers and the forward motion of the carriage $h^3$ against the fixed cutting-knife $a^3$, so that the instant cutting off of the spring is obtained. The intermittent forward motion of the rail $t^3$ takes place once for each revolution of the driving-shaft by means of a disk, $S^3$, that is keyed to the vertical shaft $q'$ and provided with a projection or nose, $u^3$, at one point of its circumference, as shown in Fig. 2. The return of the rail $t^3$ is obtained by a spiral spring, $v^3$. (Shown in Fig. 2.)

For the purpose of removing the small remaining pieces of wire from the bending-rolls and the concave plate Q, the bearing-block U of the plate is supported on a bracket, $K^3$, which can be raised or lowered by means of a screw worked by a hand-crank, $L^3$, the screw engaging a nut of the bracket $K^3$. The screw-nut $Q^3$ serves for tightly securing the bracket $K^3$, while the set-screws $w^3$ and nuts $Z^3$ serve to adjust the exact position of the plate Q relatively to the bending-rolls M and N.

The wire in passing through the machine takes the following course: It passes along the grooved roller K to the bending-roll M, and between the grooved guide-segment L and the bending-roll M, downward and between the bending-rolls M and N to the spiral-bending mechanism arranged on the concave plate Q, immediately below the bending-roll M. The wire is there taken up by the steel throat $d$, conducted along the groove $e$, past the first fixed roller, $f'$, and along the laterally-movable roller $f$ to the third roller, $f^2$, whence it passes along the roller $m$, slot K, and shaft $i$ of the block V to the grooved roller $g$ of the pusher-rod R, which roller, by the increasing eccentricity of its actuating-cam, increases the pitch of the spiral convolutions until the middle is reached, after which the pitch of the convolutions gradually decreases until the second half of the wire spring is formed and passed through the space between the cutting-knives above the bending-roll M, it being cut off at the moment the double helical spring is entirely completed.

Having thus described my invention, I claim as new and desire to secure by Letters Patent—

1. In a machine for bending double helical springs, the combination of a pair of grooved bending-rolls, means for imparting a spiral bend to the wire, means for imparting a double helical form to said spirally-bent wire, and an intermittently-actuated cutting mechanism arranged above and transversely to said bending mechanism, substantially as described.

2. In a machine for bending double helical wire springs, the combination of bending-rolls M N, plate Q, having a spiral groove, $e$, guide-rollers $f'$ $f^2$, bending-roller $f$, and mechanism for laterally reciprocating the roller $f$, substantially as set forth.

3. In a machine for bending double helical wire springs, the combination of the bending-rolls M N, concave plate Q, having spiral groove $e$, guide-rollers $f'$ $f^2$, bending-roller $f$, laterally-guided carrier O, supporting the roller $f$, slide-piece $s$, engaging the carrier O, and mechanism for reciprocating the slide-piece $s$, substantially as set forth.

4. In a machine for bending double helical wire springs, the combination of the bending-rolls M N, concave plate Q, having a spiral groove, $e$, guide-rollers $f'$ $f^2$, laterally-movable bending-roller $f$, roller $T^3$, shaft $i$, and block V, having a groove, K, with a laterally-oscillating and reciprocating pusher-rod, R, having a grooved bending-roller, $g$, substantially as and for the purpose described.

5. In a machine for bending double helical wire springs, the combination of main bending-rolls M N, intermediate mechanism for imparting a spiral bend to the wire, roller $T^3$, shaft $i$, block V, having delivery-groove K, spring-pressed pusher-rod R, having a grooved end roller, $g$, and being supported in a pivoted front bearing, $A^2$, and an obliquely-slotted rear bearing, $B^2$, and mechanism for imparting reciprocating motion to the pusher-rod, substantially as set forth.

6. In a machine for bending double helical wire springs, the combination of an intermittently-actuated cutting mechanism, arranged above and transversely to the compound wire bending mechanism, means whereby the cutting-knives are moved backward with the wire spring, and mechanism whereby the cutting-knives are actuated at the moment the wire spring is completed, substantially as specified.

GUSTAV DENTGEN.

Witnesses:
 HUGO WILOP,
 OSCAR MILLER.

It is hereby certified that the name of the patentee of Letters Patent No. 309,295, granted December 16, 1884, for an improvement in "Machines for Bending Wire Springs," was erroneously written and printed "Gustav Dentgen;" that said name should have been written and printed *Gustav Deutgen;* and that the proper correction has been made in the files and records pertaining to the case in the Patent Office, and should be read in the Letters Patent to make it conform thereto.

Signed, countersigned, and sealed this 23d day of December, A. D. 1884.

[SEAL.]

M. L. JOSLYN,
*Acting Secretary of the Interior.*

Countersigned:
BENJ. BUTTERWORTH,
*Commissioner of Patents.*